Nov. 13, 1962 J. D. GUEST 3,064,257

ANTENNA WITH ADJUSTABLE TUNING REACTANCE

Filed Feb. 14, 1958

James D. Guest
INVENTOR.

BY Clarence A. O'Brien
and Harvey B. Jacobson
Attorneys

United States Patent Office 3,064,257

Patented Nov. 13, 1962

3,064,257

ANTENNA WITH ADJUSTABLE TUNING REACTANCE

James D. Guest, P.O. Box 808, Duncan, Okla.

Filed Feb. 14, 1958, Ser. No. 715,374
9 Claims. (Cl. 343—747)

This invention relates generally to tuning means for an electrical circuit and more particularly to capacitive tuning means for the establishment of a particular resonant frequency for the circuit.

It is old and well known in the eletcrical art that a circuit including inductive and capacitive elements may be tuned so as to particularly accept certain frequencies or to particularly block certain frequencies. The values of the capacitive and inductive elements define what is called natural resonant frequency for the circuit enabling the circuit to particularly accept or pass electrical signals having a frequency approximate the natural circuit frequency and further enabling the circuit to block or filter electrical signals having frequencies remote from the resonant frequency. The establishment of a particular resonant frequency for a particular circuit is made either by varying the inductance value of the inductive element or by varying the capacitance value of the capacitive element. The prior art generally teaches the method of slug tuning for performing the initial procedure. That is, by changing the magnetic characteristics of the path about an inductor, the inductance of the inductive element or coil will change. More particularly, a coil in free space will not have as great an inductance as the same coil having a magnetic core. If it be desired to adjust the resonant frequency by the second procedure, namely, the variation of the circuit capacitance, parallel plate capacitors are often utilized. By moving some parallel plates relative to other parallel plates the effective area of charge storage between the plates is varied and the resulting capacitor value of the element is varied. Each of these procedures are old and well known in the art but, however, are possessed with inherent practical limitations for certain uses. For example, in the antenna art, when it is desired to electrically tune the filter traps for instance in a triband antenna, the utilization of either slug tuning or parallel plate tuning proves practically inadequate. The inadequacies should be apparent. It is well known that the most common antenna construction consists almost entirely of aluminum so as to keep the antenna light in weight and conserve on installation expenses. The incorporation of a heavy movable magnetic slug in this antenna would prove to be cumbersome and relatively expensive. Further, the prior art has not as yet developed a simple and inexpensive means of installing and utilizing variable parallel plates on an antenna.

With particular regard to the shortcomings of the prior art as noted above, the development of a novel and efficient tuning system utilizing a minimum of individual parts and being mechanically and structurally sound was imperative. Therefore, it is the principal object of this invention to provide a novel and improved electrical circuit tuning system.

It is a further object of this invention to provide a novel and improved compact electrical circuit utilizing heretofore unknown capactive tuning means.

It is a still further object of this invention to provide a novel and improved electrical circuit construction which is extremely light in weight considering its variable function.

It is a still further object of this invention to provide a novel and improved electrical circuit which may be utilized outdoors and is substantially impervious to adverse weather conditions.

It is a still further object of this invention to provide novel and improved electrical circuit tuning means in combination with an antenna.

In accordance with the above stated objects, below is described a novel and improved electrical tuning system capable of beneficial utilization in innumerable electrical circuits but particularly adapted for use in a triband antenna system for receiving, for example, the ten meter, fifteen meter and twenty meter bands on a single antenna structure. The tuning is capacitive tuning and is effectively accomplished by changing an inherent capacity of the circuit structure by varying an effective area. More particularly, the invention contemplates the use of a non-magnetic conductive core which may, for instance, be an antenna arm. The core would have at least one aperture therein and be hollow so as to accommodate an auxiliary core, movable with respect to the first named core, adapted to occupy varying portions of the aperture area. An insulator surrounds the first named core and a bare coil is wound about the insulator. By varying the aperture area, by moving the auxiliary core relative to the first named core, the effective area between the conductive first named core and the bare coil is varied. The particular embodiment disclosed below features the auxiliary core as being slidably mounted within the first named core. The effective area change varies the effective circuit capacitance so as to vary the circuit resonant frequency. Further, a conductive casing surrounds the coil and is spaced therefrom for providing additional circuit capacitance as between the core and the casing and the coil and the casing while providing covering for the bare coil so as to prevent shorting when the system is subjected to adverse weather conditions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
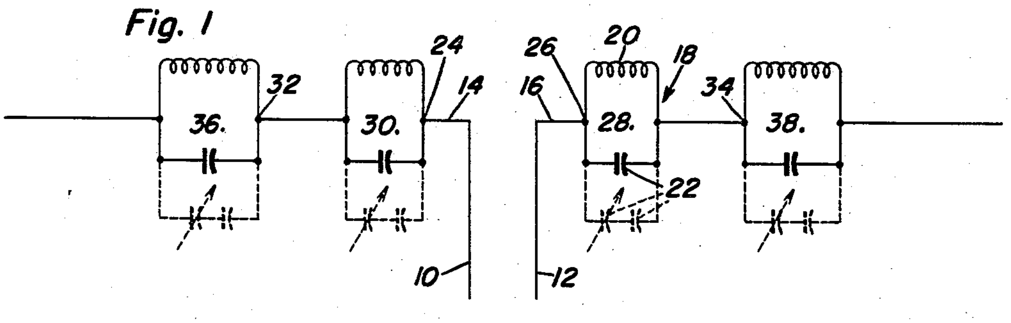
FIGURE 1 is a schematic diagram of a triband antenna utilizing the teachings of this invention.
Figure 2:
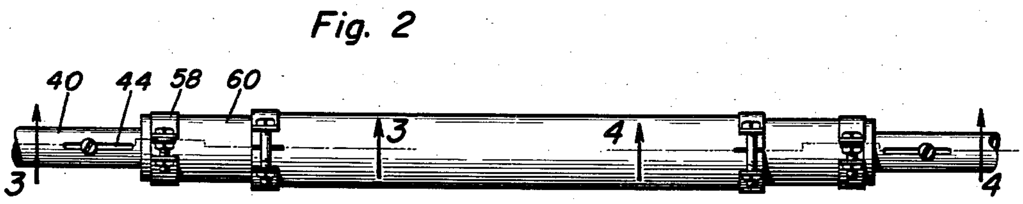
FIGURE 2 is an elevational plan view of a circuit structure utilizing the teachings of this invention.

With continuing reference to the drawings and initial reference to FIGURE 1, a triband antenna system is shown, for example only, to illustrate the principles of this invention. More specifically, FIGURE 1 shows a dipole system having lead-ins 10 and 12 which extend to dipole portions 14 and 16. A filter trap 18 is electrically connected in series with the dipole 16 and includes an inductive coil 20 and various capacitors 22. It is seen that the electrical combination of the inductor and capacitors form a parallel circuit which would have a particular resonant frequency. In exemplary use, the ten meter band having a particular megacycle frequency utilizes the portion of the antenna between 24 and 26, the respective sections 28 and 30 trapping or filtering the lower frequencies and therefore effectively electrically terminating the antenna at points 24 and 26. Further, the fifteen meter band may utilize the antenna portion between 32 and 34 as sections 36 and 38 effectively electrically terminate the antenna length at these points for the fifteen meter frequency. Likewise, the twenty meter band may utilize the entire antenna length.

Figure 3:
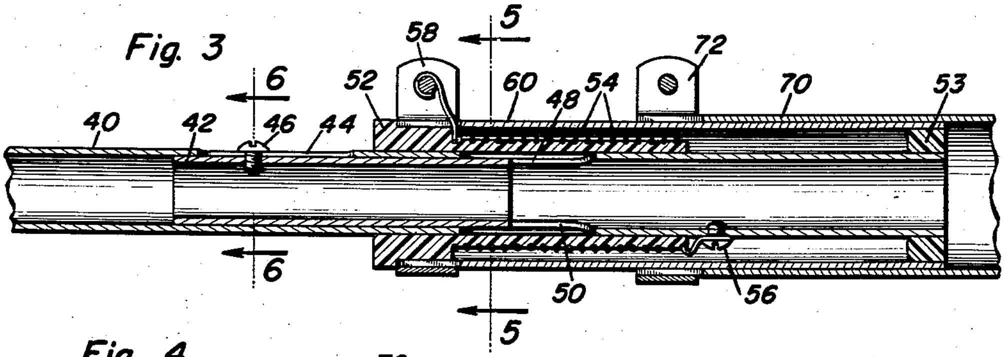
FIGURE 3 is a sectional view taken substantially along the plane 3—3 of FIGURE 2.
Figure 4:
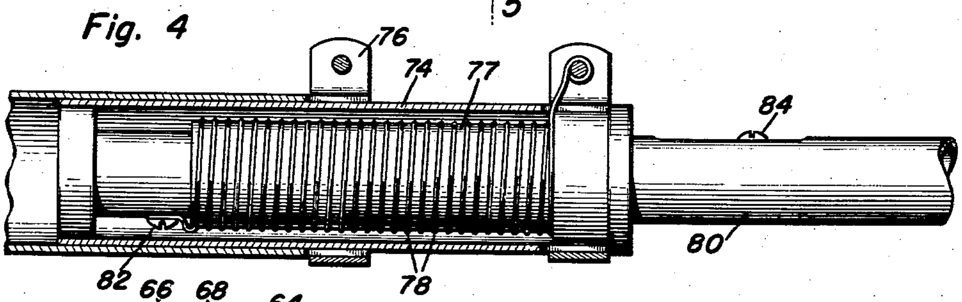
FIGURE 4 is a sectional view taken substantially along the plane 4—4 of FIGURE 2.
Figure 5:
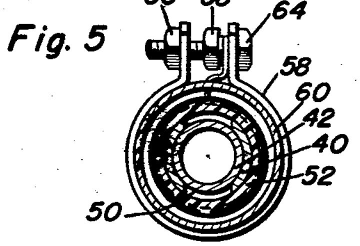
FIGURE 5 is a sectional view taken substantially along the plane 5—5 of FIGURE 3.
Figure 6:
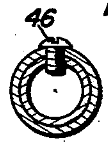
FIGURE 6 is a sectional view taken substantially along the plane 6—6 of FIGURE 3.

With particular reference to FIGURE 3, numeral 40 represents an extended main conductive core which may be an antenna arm. The main core is constructed of a lightweight conductive material and extended with respect to the conductive casing 60. The main core 40 is hollow and slidably supports therein an auxiliary core 42 constructed of a material conveniently identical to the material utilized in the main core 40. The main core 40 has a slot which allows a screw 46 to slide therein. The screw 46 is threadedly engaged with an aperture in the auxiliary core 42. It should be apparent that a manual sliding force on screw 46 along the slot 44 will move the auxiliary core 42 relative to the main core 40. At a desired extended portion of the core 40, the screw 46 may be screwed tightly down upon the sides of slot 44 so as to assure a fixed positioning of the auxiliary core 42 relative to the main core 40. The main core 40 has a pair of surface exposing apertures as at 48 and 50 on the enclosed portion of the core 40. As is apparent from FIGURE 3, the auxiliary core 42 is adapted to slide within the main core 40 and to selectively close a portion of the main core apertures 48 and 50 to vary the surface area exposed therethrough.

An insulative dielectric 52 is maintained around core 40 and supports a bare electric coil 54 therearound. For convenience sake, preformed recesses may be established in the insulator 52 so as to properly space the turns of the coil 54. The coil 54 is electrically connected to a terminal 56 which is in turn electrically connected to the main core 40. The coil 54 is further electrically connected at its opposite end to a clamp 58 which is electrically connected to the conductive casing 60. The clamp 58 is shown affixing the conductive casing 60 to the insulator 52. The clamp is held tight by a bolt 64 and a pair of nuts 66 and 68. The particular clamping means of course is only incidental to the teachings of the invention and numerous other means would be apparent to one skilled in the art. An electrical extension portion 70 is shown clamped to the casing 60 by a clamp 72 similar to the clamp 58. It will be noted therefore that an electrical series circuit will proceed from the casing 60 through the extension 70 to a second casing 74 through clamp 76. This casing 74 encloses a structure similar to the casing 60 in that an insulator portion 76 has maintained thereon a bare coil 78 which is electrically connected to the conductive core 80 through a terminal arrangement at 82. A screw 84 is adapted to slide in a slot in core 80 and carries therealong an auxiliary core (not shown) similar to the auxiliary core 42. The core 80 has apertures similar to the apertures 48 and 50 of core 40 whose area is adapted to be varied by the auxiliary core.

In use, a coil is designed to operate most favorably at certain frequencies. However, all coils have certain tolerances and capacitive tuning is used to establish the correct circuit resonant frequency. By varying the effective area between the main core 40 and the casing 60 and further by varying the effective area between the main core 40 and the conductive coil 54, the inherent capacitance of the electrical circuit may be selectively varied so as to establish the desired resonant frequency and compensate for tolerances in the manufacture of the electrical coils. Likewise, if in the use of this device in an antenna, it be desired to convert the antenna electrical length so as to efficiently receive different signals, the resonant frequency of the circuit may be varied by varying the effective area of the main core 40. As noted above, this effective area is varied by selectively varying the aperture area as shown at 48 and 50.

In summary, what has been taught is the novel conception of capacitively tuning an electrical circuit by varying an effective area between two members utilizing main core apertures and an auxiliary core. The invention would find its primary use and advantages where a lightweight, easily adjustable, and weatherproof (it is to be noted that the coil 54 is effectively shielded from adverse weather conditions by insulator 52, insulator 53 and casing 60) circuit is desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A novel and improved dipole antenna tuning circuit including an elongated antenna arm, at least one aperture in said antenna arm, an insulative material carried about said antenna arm adjacent said aperture, an electrical coil carried by said insulative material, an auxiliary arm movably carried within said antenna arm so as to vary the said aperture area and accordingly the effective area between said antenna arm and said coil, a conductive casing surrounding said coil spaced therefrom, said coil being electrically connected between said antenna arm and said casing whereby said coil constitutes a circuit inductance and the insulated spacing between the coil and the variable effective antenna arm area, a variable circuit capacitance.

2. In an electrical circuit, an electrically conductive hollow main core having a continuous perimeter, an electrically insulative material about said main core, an electrically conductive coil wound about said insulative material and electrically connected to the main core, and means attached to said hollow main core for selectively changing the effective area between said hollow main core and said coil, said means including at least one aperture in said hollow main core, an auxiliary core, said auxiliary core being received within said main core for slidable movement relative thereto, a slot in said main core, and a projection on said auxiliary core extending through said slot for slidable adjustment of the auxiliary core.

3. In an electrical circuit, a hollow electrically conductive main core having a continuous peripheral surface, a coil wound about said hollow main core and insulated therefrom but electrically connected thereto, means attached to said hollow main core for selectively changing the effective area between said hollow main core and said coil, said means including at least one aperture of variable dimension defined in said main core peripheral surface, an auxiliary core movably mounted adjacent to said main core and in electrical contact therewith for movement relative thereto to vary the dimension of said aperture.

4. The combination of claim 3 including means attached to said auxiliary core for moving said auxiliary core and an electrically conductive casing adapted to surround said coil spaced therefrom but electrically connected thereto.

5. In an antenna system, antenna tuning means comprising a hollow electrically conductive antenna arm having a continuous peripheral surface, a coil wound about said antenna arm and insulated therefrom but electrically connected thereto, means attached to said antenna arm for selectively changing the effective area between said antenna arm and said coil, said means including at least one aperture defined in said antenna arm peripheral surface, an auxiliary antenna arm movably mounted relative to said antenna arm and in electrical contact therewith for varying the aperture on the peripheral surface of the antenna arm and an electrically conductive casing mounted around said coil and spaced therefrom but electrically connected thereto.

6. A tuning device comprising, conductive casing means, extended conductive means mounted in non-conductive relation to the conductive casing means for establishing a predetermined capacitive impedance therebetween, inductive means fixedly mounted with respect to the conductive casing means and electrically connected to both conductive means for introducing inductive impedance therebetween, and variable surface exposure means mounted on the extended conductive means for variation of capacitive impedance between the extended conductive means and the inductive means.

7. The combination of claim 6, wherein said inductive means comprises dielectric means fixedly mounted within said conductive casing means and disposed about the extended conductive means, and electrically conductive inductive coil means mounted on the dielectric means and in spaced relation to the extended conductive means, said inductive coil means being electrically connected to both conductive means.

8. The combination of claim 7, wherein said variable surface exposure means comprises an enclosed portion of the extended conductive means enclosed within the inductive means and having a dimensionally fixed opening therein, and adjustably movable means mounted on an extended portion of the extended conductive means for variably reducing the opening in said enclosed portion of the extended conductive means.

9. The combination of claim 6, wherein said variable surface exposure means comprises an enclosed portion of the extended conductive means enclosed within the inductive means and having a dimensionally fixed opening therein, and adjustably movable means mounted on an extended portion of the extended conductive means for variably reducing the opening in said enclosed portion of the extended conductive means.

References Cited in the file of this patent

UNITED STATES PATENTS

| | | |
|---|---|---|
| 1,441,212 | Cardwell | Jan. 9, 1923 |
| 2,069,513 | Wolff | Feb. 2, 1937 |
| 2,251,631 | Mayer | Aug. 5, 1941 |
| 2,419,311 | Bigue | Apr. 22, 1947 |
| 2,575,199 | Stutt | Nov. 13, 1951 |
| 2,598,810 | Lyman | June 3, 1952 |
| 2,622,203 | Kiebert et al. | Dec. 16, 1952 |
| 2,753,530 | Horvath | July 3, 1956 |
| 2,758,268 | Peysson | Aug. 7, 1956 |
| 2,786,976 | Roemer | Mar. 26, 1957 |
| 2,826,698 | Mason | Mar. 11, 1958 |
| 2,860,248 | Lyman | Nov. 11, 1958 |

FOREIGN PATENTS

| | | |
|---|---|---|
| 561,787 | Great Britain | June 5, 1944 |
| 577,863 | Great Britain | June 4, 1946 |
| 628,986 | Great Britain | Sept. 8, 1949 |
| 707,142 | Great Britain | Apr. 14, 1954 |